United States Patent
Zhou et al.

(10) Patent No.: US 9,703,171 B2
(45) Date of Patent: Jul. 11, 2017

(54) MICROSCOPIC IMAGE DETECTING INSTRUMENT AND AUTOMATIC FOCUSING METHOD THEREFOR

(71) Applicant: Suzhou Hyssen Electronics Co., LTD, Suzhou (CN)

(72) Inventors: Xiao-Mou Zhou, Suzhou (CN); Yan-Feng He, Suzhou (CN); Jun Xu, Suzhou (CN); Guo-Jun Fang, Suzhou (CN)

(73) Assignee: Suzhou Hyssen Electronics Co., LTD, Suzhou (CN)

( * ) Notice: Subject to any disclaimer, the term of this patent is extended or adjusted under 35 U.S.C. 154(b) by 296 days.

(21) Appl. No.: 14/690,388

(22) Filed: Apr. 18, 2015

(65) Prior Publication Data

US 2015/0219979 A1 Aug. 6, 2015

Related U.S. Application Data

(63) Continuation of application No. PCT/CN2013/084036, filed on Sep. 24, 2013.

(30) Foreign Application Priority Data

Oct. 18, 2012 (CN) .......................... 2012 1 0398769

(51) Int. Cl.
*H04N 9/47* (2006.01)
*G02F 1/35* (2006.01)
(Continued)

(52) U.S. Cl.
CPC .......... *G02F 1/3511* (2013.01); *G02B 21/245* (2013.01); *G02B 21/365* (2013.01)

(58) Field of Classification Search
CPC .... G02B 21/245; G02B 21/365; G02F 1/3511
(Continued)

(56) References Cited

U.S. PATENT DOCUMENTS

2001/0033414 A1 10/2001 Yahiro
2007/0109557 A1* 5/2007 Saito .................. G01B 11/0608
356/602

FOREIGN PATENT DOCUMENTS

CN 1641397 A 7/2005
CN 101498831 A 8/2009
(Continued)

OTHER PUBLICATIONS

Zhou Xiao-Mou, "Research on Automatic Detection and Image Processing for Urine Micro-particles", Chinese Doctoral Dissertations Full-text Database Information, Science and Technology, Oct. 15, 2012, No. 10 p. I138-54, ISSN 1647-022X.

*Primary Examiner* — Robert Chevalier
(74) *Attorney, Agent, or Firm* — Steven Reiss

(57) ABSTRACT

A microscopic image detecting instrument includes a microscope, a photographing device, a driver, a mark having a predetermined distance from an object, and a controller coupled to the photographing device and the driver. The microscope includes an object stage for holding the object and an objective lens for focusing on and magnifying the object. The photographing device is set above the objective lens to photograph an image presented by the objective lens. The controller controls the driver to move at least one of the object stage and the objective lens to an actual focusing position, according to an actual focal length to the object. The actual focal length to the object is calculated by the controller according to a comparison between an optical definition of a mark image taken as a preliminary target of focus against a predetermined definition calibration curve and the distance between the mark and the object.

17 Claims, 6 Drawing Sheets

(51) Int. Cl.
*G02B 21/24* (2006.01)
*G02B 21/36* (2006.01)
(58) Field of Classification Search
USPC .......................................... 348/79, 64, 77, 98
See application file for complete search history.

(56) References Cited

FOREIGN PATENT DOCUMENTS

| | | | |
|---|---|---|---|
| CN | 101900536 | A | 12/2010 |
| CN | 102062929 | A | 5/2011 |
| CN | 102087413 | A | 6/2011 |
| CN | 203249859 | U | 10/2013 |
| JP | 2007187809 | A * | 7/2007 |
| WO | 2012013586 | A2 | 2/2012 |
| WO | 2012025220 | A1 | 3/2012 |

* cited by examiner

MICROSCOPIC IMAGE DETECTING INSTRUMENT AND AUTOMATIC FOCUSING METHOD THEREFOR

CROSS-REFERENCE TO RELATED APPLICATIONS

This application claims all benefits accruing under 35 U.S.C. §119 from China Patent Application No. 201210398769.4, filed on Oct. 18, 2012 in the China Intellectual Property Office, the content of which is hereby incorporated by reference. This application is a continuation under 35 U.S.C. §120 of international patent application No. PCT/CN2013/084036, filed on Sep. 24, 2013.

BACKGROUND

1. Field

The present invention relates to medical instrument technologies, and particularly, to a microscopic image detecting instrument and automatic focusing method therefor.

2. Background

Currently, a microscopic imaging system of a well-known urine analyzer has a fixed-focus. The microscopic imaging system starts to focus from a fixed optical coupling reset position and then moves the objective lens of a microscope to a focal plane of the objective lens by advancing a stepping motor at predetermined steps. A sharpness of the image depends on accuracy of mechanical motion and a non-deformable structure of the microscopic imaging system.

However, an object stage of the microscopic imaging system may go through some gaps or backlashes during a movement due to factors such as machining tolerances, assembly tolerances, transport, and shaking. These factors compromise a positional accuracy of the object stage and change an object distance of the microscopic imaging system. A thermal deformation of the microscopic imaging system caused by ambient temperature changes also leads to a drift and change of the object distance. Therefore, the image may become blurred or unstable because distance between the objective lens and a testing pool is changed during switches of the objective lens and movement of the object stage. A high-quality image is very important to recognition and analysis of digital images. The user usually has to manually focus in order to get the high-quality image, which increases difficulty of use and fails to meet demands of a fully automatic system.

What is needed, therefore, is a microscopic image detecting instrument and automatic focusing method for using the same.

SUMMARY

The main technical problem to be solved by the present invention is to provide automatic focusing by a microscopic imaging detecting instrument and an automatic focusing method therefor.

The present invention provides a microscopic image detecting instrument including a microscope, a photographing device, a driver, a mark, and a controller. The microscope includes an object stage configured to hold an object to be measured and an objective lens configured to focus on and magnify the object to be measured. The photographing device is set above the objective lens and configured to photograph an image presented by the objective lens and output image data. The driver is configured to drive at least one of the object stage and the objective lens move to a predetermined position. The mark is set in a detecting area of the objective lens at a predetermined distance from the object to be measured. The controller is coupled to the photographing device and the driver and configured to process data and generate control instructions. The controller receives a detect instruction, acquires initial focusing position data, and controls at least one of the object stage and the objective lens to move to an initial focusing position, according to the initial focusing position data. The photographing device photographs the mark in the detecting area and outputs data of the mark image to the controller. The controller calculates an optical definition of the mark image and compares the optical definition with a predetermined definition calibration curve to acquire a focal compensation value. The controller calculates an actual focal length to the object to be measured according to the sum of the focal compensation value and the predetermined distance between the mark and the object to be measured. The optical definition is defined as an indicator representing edge sharpness of the mark image photographed by the photographing device having an invariable resolution, and the definition calibration curve is a curve which represents optical definitions of the images of the mark which can vary according to the photographed positions.

The present invention provides an automatic focusing method for the microscopic image detecting instrument. The microscopic image detecting instrument includes a microscope, a photographing device, and a mark. The microscope includes an object stage configured to hold an object to be measured and an objective lens configured to focus on and magnify the object to be measured. The mark is set in a detecting area of the objective lens at a predetermined distance from the object to be measured.

The automatic focusing method includes acquiring initial focusing position data; moving at least one of the object stage and the objective lens along an optical axis of the objective lens, to an initial focusing position according to the initial focusing position data; controlling the photographing device to photograph the mark in the detecting area of the objective lens during the movement of the object stage or the objective lens; and calculating an optical definition of an image of the mark. The optical definition of the mark image is compared against a predetermined definition calibration curve to acquire a focal compensation value, wherein the definition calibration curve is a curve which represents optical definitions of the images of the mark which can vary according to the photographed positions. An actual focal length to the object to be measured according to the focal compensation value and a predetermined distance between the mark and the object to be measured is calculated. The optical definition is defined as an indicator representing edge sharpness of the mark image photographed by the photographing device having an invariable resolution.

The present invention includes an automatic focusing system for a microscopic image detecting instrument. The microscopic image detecting instrument includes a microscope, a photographing device, and a mark. The microscope includes an object stage configured to hold an object to be measured and an objective lens configured to focus on and magnify the object to be measured. The mark is set in a detecting area of the objective lens at a predetermined distance from the object to be measured. The automatic focusing system includes an information acquiring module, a first control module, a second control module, a first calculating module, and a second calculating module. The information acquiring module is configured to acquire initial focusing position data. The first control module is configured to control at least one of the object stage and the objective lens to move to an initial focusing position along an optical axis of the objective lens according to the required initial focusing position data. The second control module is configured to control the photographing device to photograph the mark in the detecting area. The first calculating module is configured to calculate the optical definitions of a plurality of mark images photographed by the photographing device. The definition is defined as an indicator representing edge sharpness of the mark image photographed by the photographing device having an invariable resolution. The second calculating module is configured to determine whether the optical definition of the mark image is within a predetermined definition range. The second calculating module is further configured to calculate an actual focal length for the object to be measured, according to the initial focusing position data and the distance between the mark and the object to be measured, if the definition of the mark image is within the predetermined definition range. The second calculating module compares the optical definition of the mark image with the definition calibration curve to acquire a focal compensation value, and calculates the actual focal length to the object to be measured according to the focal compensation value and the distance between the mark and the object to be measured, if the optical definition of the mark image is outside the predetermined definition range. The definition calibration curve is a curve which represents optical definitions of the mark images which can vary according to the photographed positions.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

The present invention is further illustrated as below by way of embodiments and accompanying drawings. A mark functioning as a dummy target is set on an object stage or platform, or in a testing pool, of a microscopic image detecting instrument working with a microscope. The mark can be selected from a group consisting of a pattern, a symbol, and a character. The mark is photographed at a default focal length before photographing each sample. A focal length variation is calculated out according to a comparison between a definition calibration curve and an optical definition of the mark. An actual focal length to an object to be measured is indirectly calculated out via the focal length variation according to a fixed distance between the mark and the object to be measured. The object to be measured is then photographed at an actual focal length. A closed-loop control system utilizing a mark image definition evaluation step is applied to a microscope focusing control and an automatic focusing of a microscope is realized.

First Embodiment

Figure 1:
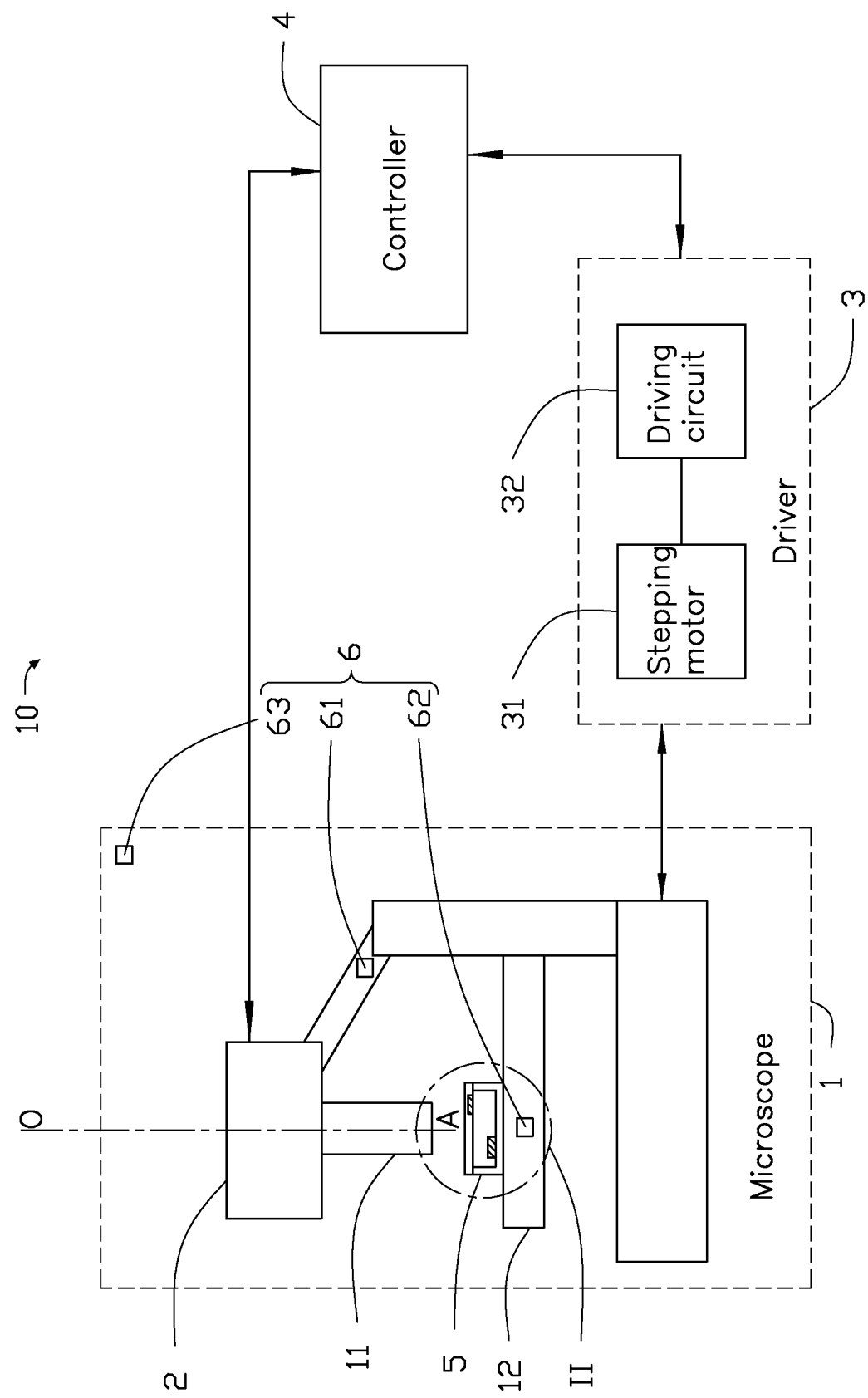
FIG. 1 is an isometric view of an exemplary embodiment of a microscopic image detecting instrument.
Figure 2:
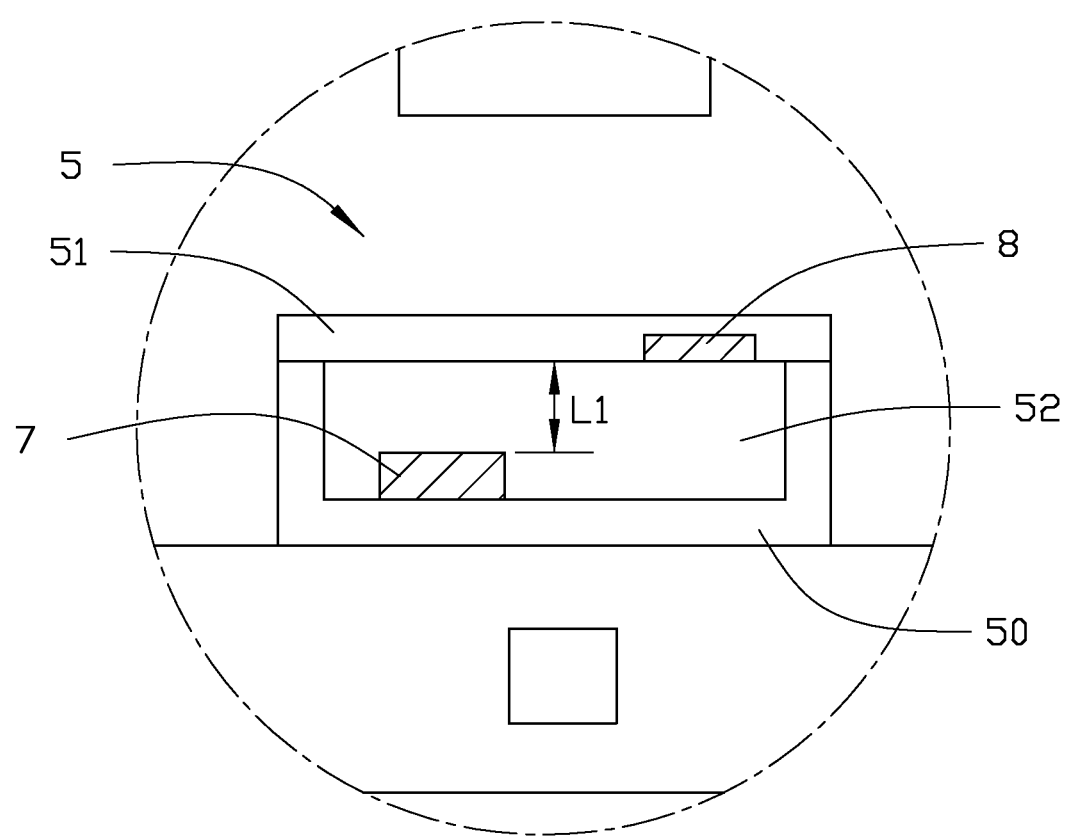
FIG. 2 is an enlarged view of a portion II of FIG. 1.

Referring to FIGS. 1 and 2, a urine analyzer for analyzing a formed element in a urine sample is taken as an example of the microscopic image detecting instrument 10 to explain the present invention.

The urine analyzer includes a microscope 1, a photographing device 2, a driver 3, and a controller 4. The microscope 1 can include an object stage 12 configured to hold an object 7 to be measured and an objective lens 11 configured to focus on and magnify the object 7 to be measured. A mark 8 can be set on the object stage 12 at a predetermined distance L1 from the object 7 to be measured along an optical axis OA of the objective lens 11. The photographing device 2 can be set above the objective lens 11 to photograph an image presented by the objective lens 11 and transmit image data from the photographing device 2 to the controller 4. The driver 3 can drive at least one of the object stage 12 and the objective lens 11 to a predetermined position. The controller 4 can be coupled to the photographing device 2 and the driver 3. The controller 4 can be configured to process data and to generate control signals based on the processed data. The photographing device 2 can be charge-coupled device (CCD) or other cameras capable of photographing. The driver 3 can include a stepping motor 31 and a driving circuit 32. The controller 4 can be a computer. A definition analyzing software can be installed in the computer and configured to analyze an optical definition of the image photographed by the photographing device 2. In this embodiment, the optical definition is defined as an indicator representing edge sharpness of the mark image photographed by the photographing device having an invariable resolution 2.

The controller 4 can acquire initial focusing position data when a detect instruction is received. The initial focusing position data is calculated according to a theoretical focal length of the objective lens. The initial focusing position data can be coordinates data or step numbers of the stepping motor 31. The controller 4 controls the driver 3 to drive at least one of the object stage 12 and the objective lens 11 to move to the initial focusing position along the optical axis OA of the objective lens 11 in accordance with the initial focusing position data. The initial focusing position data can be called a theoretical focal plane. In theory, the photographed image of the object 7 to be measured has the definition peak when at least one of the object stage 12 and the objective lens 11 is positioned at the initial focusing position. However, an actual focusing position may deviate from the theoretical focusing position due to the factors, such as mechanical deformation or temperature variation. Therefore, a focal compensation value needs to be calculated. An actual focusing position data is calculated according to a sum of the focal compensation value and the predetermined distance L1 between the mark 8 and the object 7 to be measured along the optical axis OA of the objective lens 11. The controller 4 controls at least one of the object stage 12 and the objective lens 11 to move, so as to bring the object 7 to be measured into a detecting area when the actual focusing position data is received. The controller 4 then controls at least one of the object stage 12 and the objective lens 11 to move to an actual focusing position along the optical axis OA of the objective lens 11 according to the actual focusing position data. The detecting area is defined as a photographing range of the objective lens 11.

In a normal situation, a testing pool 5 is set on the object stage 12. The mark 8 can be set on the testing pool 5. For example, the mark 8 can be set on a glass slide in the testing pool 5, an inner bottom surface of the testing pool 5, or an outer bottom surface of the testing pool 5. The mark 8 also can be set on the object stage 12. For example, the mark 8 can be set on the object stage 12 near the testing pool 5 or can be covered by the testing pool 5. The mark 8 can also be set at some other location where it is clearly visible to the photographing device 2. The predetermined distance L1 is defined between the mark 8 and the object 7 to be measured along the optical axis OA of the objective lens 11 no matter where the mark 8 is set. Therefore, a fixed distance relationship exists between the mark 8 and the object 7 to be measured along the optical axis OA of the objective lens 11.

In this embodiment, the test pool 5 includes a receiving base 50 and a cover 51. The receiving base 50 defines a receiving groove 52 therein to receive the object 7 to be measured. The mark 8 is formed at a bottom surface of the cover 51 facing the receiving groove 52. The mark 8 is deviated from the object 7 to be measured along the optical axis OA of the objective lens 11.

The definition calibration curve needs to be determined at first. The mark 8 is photographed according to the initial focusing position data. The optical definition of a mark image is calculated. The focal compensation value is determined according to the comparison between the calculated optical definition of the mark image and the definition calibration curve. The actual focusing position data is determined according to the focal compensation value and the predetermined distance L1 between the mark 8 and the object 7 to be measured.

The definition calibration curve can be saved in the controller 4 in advance or created by the user when the microscopic image detecting instrument 10 starts to work. For example, the microscopic image detecting instrument 10 automatically generates the definition calibration curve of the mark 8 when the microscopic image detecting instrument 10 is initialized at bootup. The definition calibration curve is generated by acquiring optical definitions of a number of mark images and a number of corresponding positions data. The definition calibration curve can be generated by following steps: at least one of the object stage 12 and the objective lens 11 is moved into the detecting area. At least one of the object stage 12 and the objective lens 11 is controlled to move along the optical axis OA of the objective lens 11, such as a Z-axis direction, and the mark 8 is photographed every time that the object stage 12 or the objective lens 11 moves a predetermined interval. The definitions of the mark images corresponding to each photographed position are calculated out. The definition calibration curve is a curve which represents optical definitions of the images of the mark 8 which can vary according to the photographed positions.

Figure 3:
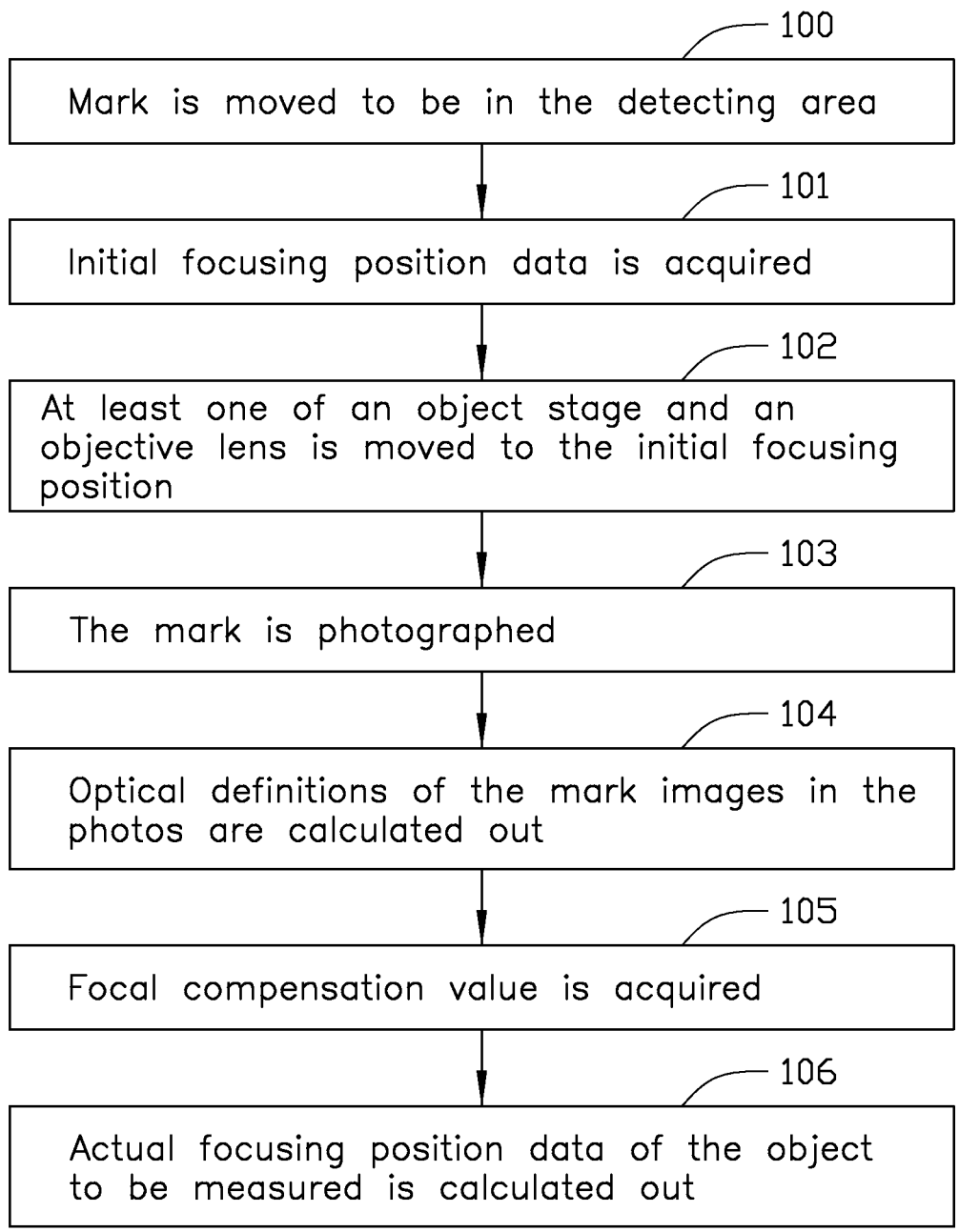
FIG. 3 is a flowchart of a first embodiment of an automatic focusing method for a microscopic image detecting instrument.

Referring to FIG. 3, a flowchart is illustrated in accordance with a first embodiment of an automatic focusing method for the microscopic image detecting instrument 10 being thus illustrated. The example method is provided by way of example, as there are a variety of ways to carry out the method. The method described below can be carried out using the configurations illustrated in FIGS. 1 and 6, for example, and various elements of these figures are referenced in explaining example method. Each blocks shown in FIG. 3 represents one or more processes, methods or blocks is by example only and order of the blocks can change according to the present disclosure. The exemplary method can begin at block 100.

At block 100, the mark 8 is moved to be in the detecting area. The mark 8 does not need to be moved if the mark 8 is already in the detecting area. The controller 4 controls at least one of the object stage 12 and the objective lens 11 to move to make the mark 8 visible within the detecting area, on the object stage 12 or in the testing pool 5. The detecting area is a photographing area within which the photographing device 2 can photograph the mark 8.

At block 101, the initial focusing position data is acquired.

The controller 4 acquires the initial focusing position data when a detect instruction is received. The initial focusing position data can be coordinates data or step numbers of the stepping motor 31. The initial focusing position data can be acquired by directly predetermining a fixed value or by finding out a position data along the optical axis of the objective lens 11, such as the Z-axis direction, corresponding to an optical definition peak of the mark images from the definition calibration curve.

At block 102, at least one of the object stage 12 and the objective lens 11 is moved to the initial focusing position.

The controller 4 controls at least one of the object stage 12 and the objective lens 11 to move to the initial focusing position along the optical axis of the objective lens 11 according to the initial focusing position data.

In one embodiment, the controller 4 converts the initial position data along the optical axis of the objective lens 11, such as in the Z-axis direction, to step numbers of the stepping motor 31 and controls the stepping motor 31 move the objective lens 11 to the initial focusing position along the optical axis of the objective lens 11, such as Z-axis direction.

At block 103, the mark 8 is photographed.

The controller 4 controls the photographing device 2 to photograph the mark 8 during the movement of the object stage 12 and/or the objective lens 11.

The controller 4 controls the photographing device 2 to take an image of the mark 8 when one of the object stage 12 and/or the objective lens 11 has been moved to the initial focusing position.

In order to reduce influences of image noise and shifting of the mark 8, the photographing device 2 also can be controlled to take at least one mark image at the predetermined interval as the object stage 12 or the objective lens 11 is moving to acquire a number of mark images corresponding to a number of positions with the predetermined interval, such as the photographing device 2 takes ten to twenty frames of mark images corresponding to the object stage 12 or the objective lens traversed ten to twenty times of the predetermined interval. Optical definitions of the mark images in the mark images are calculated according to following steps. The photographing device 2 can start to take the mark images when at least one of the object stage 12 and the objective lens 11 is moved to a position which is a fixed distance away from the initial focusing position and cease taking mark images when the object stage 12 or the objective lens 11 is positioned at the initial focusing position. That is, the last mark image is taken at the initial focusing position. The photographing device 2 also can start to take the mark images when the object stage 12 or the objective lens 11 is positioned at the initial focusing position and then continue to take mark images with the object stage 12 or the objective lens 11 moving up or down by predetermined interval.

At block 104, the optical definitions of the mark images in the mark images are calculated out. The controller 4 calculates the optical definition of the mark images via the definition analyzing software.

At block 105, the focal compensation value is acquired. The optical definitions of the mark images are compared with the definition calibration curve to acquire the focal compensation value.

If the controller 4 controls the photographing device 2 to take only one mark image of the mark 8, the controller 4 receives data of the mark image to calculate the definition of the single mark image. The controller 4 finds out a second position data corresponding to the definition peak on the definition calibration curve and a fourth position data corresponding to the optical definition of the mark image on the definition calibration curve. The controller 4 calculates a difference between the second position data and the fourth position data. The focal compensation value is zero if the difference between the second position data and the fourth position data less than a predetermined threshold value. The focal compensation value is a difference between the initial focusing position data and the second position data if the difference between the second position data and the fourth position data is greater than the predetermined threshold value.

If the controller 4 controls the photographing device 2 to take many mark images of the mark 8, the controller 4 receives data of the mark images to calculate an optical definition of each mark image. The controller 4 generates a definition curve segment by arranging the optical definitions of the mark images in accordance with data as to a sequence of positions at which mark images were taken. The controller 4 matches the definition curve segment with the definition calibration curve to determine a best matching position of definition on the definition calibration curve. The best matching position of definition on the definition calibration curve is defined at a position on the definition calibration curve having a minimal definition difference between the definition curve segment and the definition calibration curve corresponding to the same position. In one embodiment, the Pearson correlation coefficient can be applied to a correlation matching between the definition curve segment and the definition calibration curve to determine a third position data corresponding to the best matching position of definition on the definition calibration curve. The controller 4 calculates the focal compensation value as a difference between the third position data with the second position data corresponding to the definition peak on the definition calibration curve. The third position data is a position data on the definition calibration curve corresponding to an optical definition of the last mark image at the best matching position of definition on the definition calibration curve.

Figure 4:
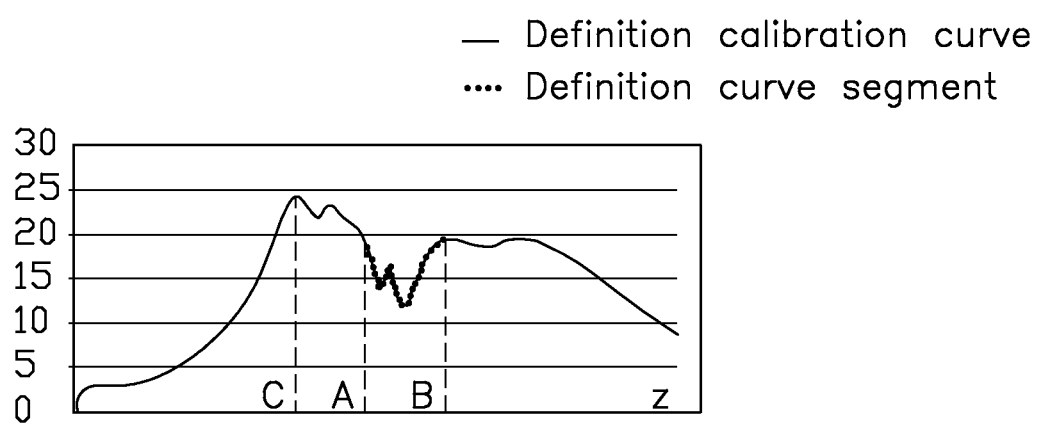
FIG. 4 illustrates an exemplary embodiment of a curve matching position theory applied in the automatic focusing method.

FIG. 4 illustrates an exemplary embodiment of a curve matching position theory. A vertical coordinate represents optical definition. A horizontal coordinate represents the positions of the object stage 12 along the optical axis of the objective lens 11, such as Z-axis direction. The solid curve represents the definition calibration curve. The dash curve represents the definition curve segment. Position C represents the second position data corresponding to the best optical definition on the definition calibration curve. A curve segment set between position A and position B is the best matching position. Position A is a position where the first mark image was taken when the object stage 12 moved along the optical axis of the objective lens 11, such as Z-axis direction. Position B is a position where the last mark image was taken. The last mark image was taken at the present position of the object stage 12, which is the third position. The focal compensation value is the difference between position B and position C.

At block 106, the actual focusing position data of the object 7 to be measured is calculated out. The controller 4 calculates the actual focusing position data to determine the actual focal length to the object 7 to be measured according to a sum of the focal compensation value and the distance between the mark 8 and the object 7 to be measured. In the embodiment of moving the object stage 12, the actual focusing position data of the object 7 to be measured is equal to the sum of the present position of the object stage 12, the focal compensation value, and the distance between the mark 8 and the object 7 to be measured. The focal compensation value and the distance between the mark 8 and the object 7 to be measured can be positive or negative according to the direction of movement.

Furthermore, the controller 4 controls at least one of the object stage 12 and the objective lens 11 to move to the actual focusing position along the optical axis of the objective lens 11, according to the actual focusing position data received by the controller 4. That is, at least one of the object stage 12 and the objective lens 11 is moved to the actual focal plane of the object 7 to be measured. The controller 4 controls the photographing device 2 to photograph the object 7 to be measured. If the object 7 to be measured is outside the detecting area, the controller 4 controls at least one of the object stage 12 and the objective lens 11 to move into the detecting area and then photographs the object 7 to be measured.

It is understood that step 100 can be executed after step 102, that is, the mark 8 needs to be within the detecting area when the mark 8 is photographed.

Second Embodiment

A difference between the second embodiment and the first embodiment is that the optical definition of the mark image is determined on the basis of whether an optical definition requirement is met or is not met when the photographing device 2 takes a mark image of the mark 8 at the initial focusing position. If the optical definition of the mark image meets the definition requirement, the controller 4 does not calculate the focal compensation value. If the optical definition of the mark image fails to meet the optical definition requirement, the controller 4 calculates the focal compensation value.

Figure 5:
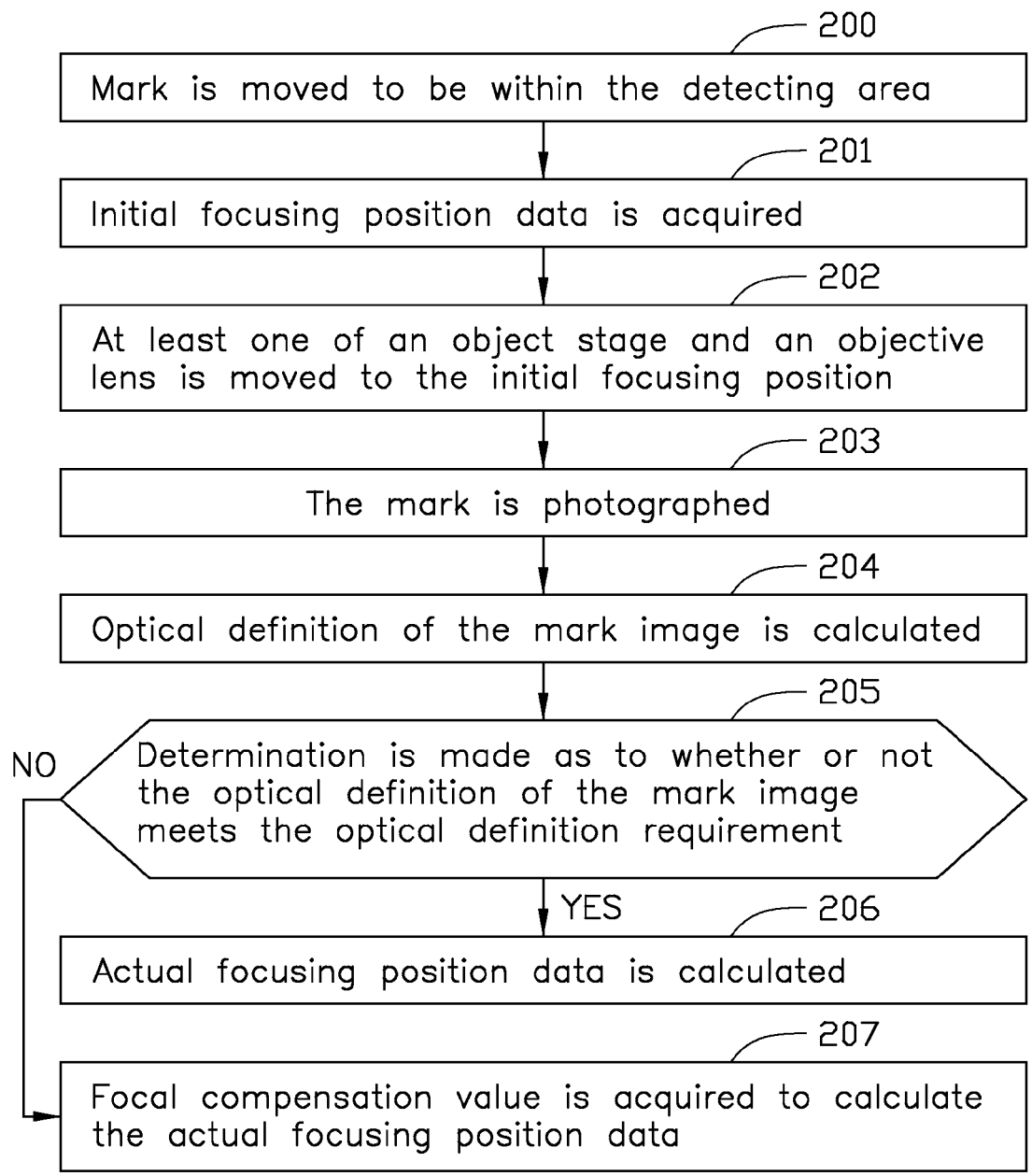
FIG. 5 a flowchart of a second embodiment of an automatic focusing method for a microscopic image detecting instrument.

Referring to FIG. 5, a flowchart is presented in accordance with a second embodiment of an automatic focusing method for the microscopic image detecting instrument is being thus illustrated. The example method is provided by way of example, as there are a variety of ways to carry out the method. The method described below can be carried out using the configurations illustrated in FIGS. 1 and 6, for example, and various elements of these figures are referenced in explaining example method. Each blocks shown in FIG. 5 represents one or more processes, methods or blocks is by example only and order of the blocks can change according to the present disclosure. The exemplary method can begin at block 200.

At block 200, the mark 8 is moved to be within the detecting area.

At block 201, the initial focusing position data is acquired.

At block 202, at least one of the object stage 12 and the objective lens 11 is moved to the initial focusing position.

At block 203, the mark 8 is photographed.

At block 204, the optical definition of the mark image is calculated.

At block 205, a determination is made as to whether or not the optical definition of the mark image meets the optical definition requirement.

If the optical definition of the mark image meets the optical definition requirement, block 206 is executed, to calculate the actual focusing position data according to the initial focusing position data and the distance between the mark 8 and the object 7 to be measured. If the optical definition of the mark image does meet the optical definition requirement, block 207 is executed, to calculate the focal compensation value by comparing the optical definition of the mark image with the definition calibration curve and then calculating the actual focusing position data according to the focal compensation value and the distance between the mark 8 and the object 7 to be measured.

In this embodiment, the optical definition of the mark 8 is considered as a closed loop feedback of the focusing control system to control the stepping motor 31, which not only decreases the number of focusing times without lowering the detecting speed but also improve sharpness and stability of the mark image. At the same time, the automatic focusing method is not affected by pollution of the testing pool 5, transparency of the medium (urine or otherwise), running time, mechanical abrasion, or other adverse circumstances. Therefore, a true automatic focus is realized.

Furthermore, the curve matching between the optical definitions with the definition calibration curve not only quickly determines the position data of the object stage 12 (or the steps number of the stepping motor 31 as the case may be) corresponding to the definition peak, but also reduces the burr and multimodal problems due to image noise or errors in movement.

Third Embodiment

The difference between the third embodiment and the first embodiment is that the urine analyzer includes a number of temperature sensors and saves a predetermined temperature-position curve in memory. The temperature sensor detects a real-time temperature. The controller 4 receives the temperature data from the temperature sensor and acquires a first position data corresponding to the temperature data on the temperature-position curve. The controller 4 considers the first position data as the initial focusing position data and controls at least one of the object stage 12 and the objective lens 11 to move to the initial focusing position along the optical axis of the objective lens 11 according to the initial focusing position data before photographing the object 7 to be measured. The mark 8 is photographed at first, and then the focal length is compensated by the method described in the first and second embodiments.

Referring to FIG. 1, the microscope 1 includes a number of temperature sensors 6, in this embodiment, there is a first temperature sensor 61, a second temperature sensor 62, and a third temperature sensor 63. The first temperature sensor 61 is set on an arm of the microscope 1. The second temperature sensor 62 is set under the object stage 12. The third temperature sensor 63 is set to detect the ambient temperature around the microscope 1. The controller 4 receives the temperature data from the temperature sensors 6 and acquires the first position data corresponding to the temperature data on the temperature-position curve. In this embodiment, the controller 4 receives the temperature data from the first temperature sensor 61, from the second temperature sensor 62, and from the third temperature sensor 63, to calculate an equivalent temperature data. The controller 4 finds out the first position data corresponding to the equivalent temperature data on the temperature-position curve. The equivalent temperature data is a temperature has an effect equivalent to a synthetic effect of an environmental temperature and an internal temperature of the urine analyzer. The equivalent temperature is a function of the environmental temperature and the internal temperature of the urine analyzer.

The microscope 1 is sealed and the metal frame has a good thermal conductivity. A temperature of a frame of the microscope 1 can therefore rise fast and the microscope 1 can experience deformation when there is a great difference between the environmental temperature and the internal temperature of the urine analyzer. When the environmental temperature slowly rises, stability and a balance with the internal temperature of the urine analyzer are maintained, and the deformation of the microscope 1 is reduced. In this embodiment, the equivalent temperature data $T_v$ can be calculated via a formula: $Tv=w1(T1-T3)+w2(T2-T3)+T3$, wherein $w1+w2=1$. The variables $w1$ and $w2$ are weight factors representing the effects of deformation of the microscope 1 caused by temperature changes. T1 represents a first temperature of a first temperature detecting position in the microscope 1. T2 represents a second temperature of a second temperature detecting position in the microscope 1. T3 represents the environmental temperature of the urine analyzer.

In other embodiments, the equivalent temperature can be calculated by other formulas.

The controller 4 renews the temperature position curve according to the real-time temperature and the focal compensation value when the focal compensation value is received.

The focal length of the microscope 1 is stable when the temperature is stable. The microscope 1 deforms corresponding to different temperatures. That is, the microscope 1 has different focal lengths corresponding to different temperatures. In order to reduce the time of focusing and speed up the sample analysis, the temperature and the focal length of optimally sharp images corresponding to the temperatures, such as stepping numbers of the stepping motor 31, are saved, and a number of temperature sensors 6 are set in the ambient environment and at some position of the microscope 1 which is sensitive to thermal deformation to represent the temperature variations throughout the body of the microscope 1. Thus, the microscope 1 can achieve the initial focal length, which is the initial focusing position data, taking account of the real-time temperature. The photographing device 2 can take a mark image with the best optical definition near the initial focal length, which decreases the length of movement of the object stage 12 or of the objective lens 11, and can adjust the microscope 1 to the actual focusing position as soon as possible.

Fourth Embodiment

Figure 6:
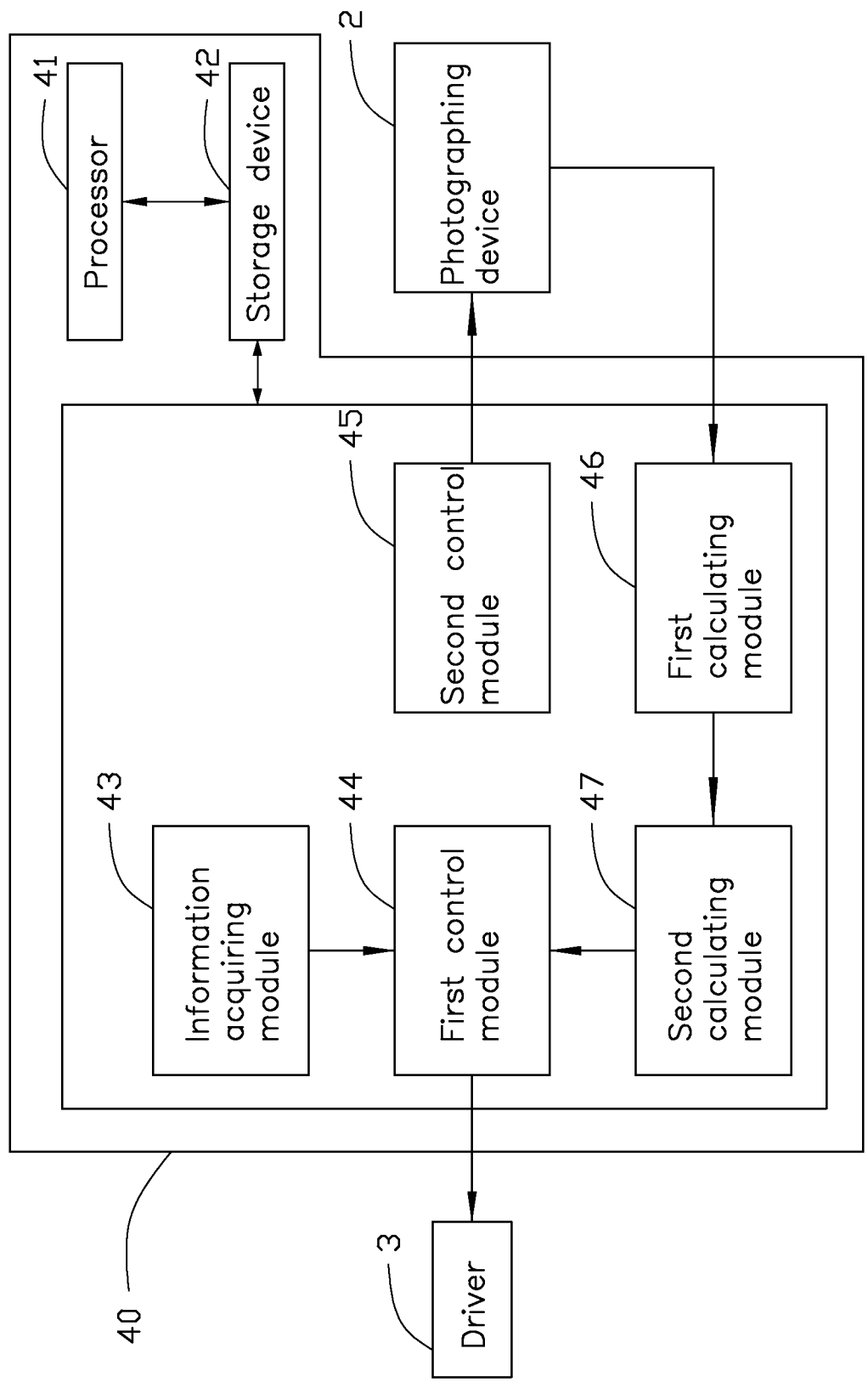
FIG. 6 is a diagram view of an exemplary embodiment of an automatic focusing system used in the microscopic image detecting instrument.

An automatic focusing system 40 used in the urine analyzer is illustrated in FIG. 6. The automatic focusing system 40 includes a processor 41, a storage device 42, an information acquiring module 43, a first control module 44, a second control module 45, a first calculating module 46, and a second calculating module 47. The storage device 42 stores a number of programs to be executed by the processor 41 to perform certain functions.

The information acquiring module 43 is configured to acquire the initial position data. The first control module 44 controls the driver 3 to drive at least one of the object stage 12 and the objective lens 11 to move to the initial position along the optical axis of the objective lens 11. The second control module 45 controls the photographing device 2 to photograph the mark 8 in the detecting area. The first calculating module 46 calculates the optical definition of the mark image taken. The optical definition is defined as an indicator representing edge sharpness of the mark image photographed by the photographing device having an invariable resolution 2. The second calculating module 47 determines whether the optical definition of the mark image is within a predetermined definition range. If the optical definition of the mark image is within the predetermined definition range, the second calculating module 47 calculates the actual focal length to the object 7 to be measured according to the initial focusing position data and the distance between the mark 8 and the object 7 to be measured. If the definition of the mark image is outside the predetermined definition range, the second calculating module 47 compares the optical definition of the mark image with the definition calibration curve to acquire the focal compensation value and calculates the actual focal length to the object 7 to be measured according to the focal compensation value and the distance between the mark 8 and the object 7 to be measured. The definition calibration curve is a curve which represents optical definitions of the images of mark 8 at different photographed positions. The first control module 44 controls at least one of the object stage 12 and the objective lens 11 to move to the actual focusing position required in relation to the actual focal length to the object 7 to be measured.

The above-described contents are detailed with specific and preferred embodiments for the present invention. The implementation of the present invention is not to be limited to these illustrations. For one of ordinary skill in the art, variations and equivalents having the same effects and applications can be made without departing from the spirit of the present invention and are to be considered as belonging to the scope of the present invention.

What is claimed is:

1. A microscopic image detecting instrument comprising:
   a microscope comprising an object stage configured to hold an object to be measured and an objective lens configured to focus on and magnify the object to be measured;
   a photographing device set above the objective lens and configured to photograph an image presented by the objective lens and output image data;
   a driver configured to drive at least one of the object stage and the objective lens move to a predetermined position;
   a mark set in a detecting area of the objective lens at a predetermined distance from the object to be measured; and
   a controller coupled to the photographing device and the driver and configured to process data and generate control instructions;
   wherein the controller receives a detect instruction, acquires initial focusing position data, and controls at least one of the object stage and the objective lens to move to an initial focusing position according to the initial focusing position data; the photographing device photographs the mark in the detecting area and outputs a data of the mark image to the controller, the controller calculates an optical definition of the mark image and compares the optical definition of the mark image with a predetermined definition calibration curve to acquire a focal compensation value, the controller calculates an actual focal length to the object to be measured according to the sum of the focal compensation value and the predetermined distance between the mark and the object to be measured, the optical definition is defined as an indicator representing edge sharpness of the mark image photographed by the photographing device having an invariable resolution, and the definition calibration curve is a curve which represents optical definitions of the images of the mark which can vary according to the photographed positions.

2. The microscopic image detecting instrument of claim 1, wherein the controller determines whether the optical definition of the mark image is in a predetermined definition range, the controller calculates the actual focal length to the object to be measured according to the initial focusing position data and the distance between the mark and the object to be measured if the optical definition of the mark image is in the predetermined definition range, and the controller compares the optical definition of the mark image with the definition calibration curve to calculate the focal compensation value if the optical definition of the mark image is outside the predetermined definition range.

3. The microscopic image detecting instrument of claim 1, further comprising a testing pool configured to receive the object to be measured, wherein the mark is set on the object stage or the testing pool.

4. The microscopic image detecting instrument of claim 1 further comprising a plurality of temperature sensors set inside and outside of the microscope, wherein the controller receives temperature data from the temperature sensors, acquires a first position data corresponding to the temperature data from a predetermined temperature-position curve, and considers the first position data as the initial focusing position data.

5. The microscopic image detecting instrument of claim 4, wherein the temperature sensors comprises a first temperature sensor set on an arm of the microscope, and a second temperature sensor set under the object stage, and a third temperature sensor set in an environment where the microscope stays, the controller receives the temperatures data from the first temperature sensor, the second temperature sensor, and the third temperature sensor to calculate an equivalent temperature data, the controller acquires the first position data corresponding to the equivalent temperature data on the predetermined temperature-position curve, and the equivalent temperature data is a temperature has an effect equivalent to a synthetic effect of an ambient temperature and an internal temperature of the microscopic image detecting instrument.

6. The microscopic image detecting instrument of claim 1, wherein the controller controls at least one of the object stage and the objective lens move to an actual focusing position corresponding to the actual focal length along an optical axis of the objective lens.

7. The microscopic image detecting instrument of claim 1, wherein the controller controls the photographing device to photographs the mark when detects at least one of the object stage and the objective lens is positioned at the initial focusing position, the controller receives the image data of the mark and calculates the optical definition of the mark image, the controller finds out a definition peak on the definition calibration curve and calculate a first difference between a fourth position data corresponding to the optical definition of the mark image on the definition calibration curve and a second position data corresponding to the definition peak on the definition calibration curve, the controller calculates the focal compensation value as zero if the difference is less than a predetermined threshold value, the controller calculates a second difference between the initial focusing position data and the second position data corresponding to the definition peak if the first difference is greater than the threshold value.

8. The microscopic image detecting instrument of claim 7, wherein the controller controls the photographing device take at least one mark image of the mark every time the object stage or the objective lens moves a predetermined interval during the movement of the object stage and the objective lens to acquire a plurality of mark images corresponding to the positions with the predetermined interval, the controller receives digital data of the mark images to calculate optical definition of each mark image, the controller generates a definition curve segment by arranging the optical definitions of the mark images in accordance with a sequence of the position data corresponding to the mark images and matches the definition curve segment with the definition calibration curve, the controller finds out a third position data corresponding to a best matching position of definition on the definition calibration curve and calculate a third difference between the third position data with the second position data as the focal compensation value, and the third position data is a position data on the definition calibration curve corresponding to an optical definition of the last mark image at the best matching position of definition.

9. An automatic focusing method for a microscopic image detecting instrument, the microscopic image detecting instrument comprising a microscope, a photographing device, and a mark, the microscope comprising an object stage configured to hold a object to be measured and an objective lens configured to focus on and magnify the object to be measured, the mark set in a detecting area of the objective lens with a predetermined distance from the object to be measured, the method comprising:
acquiring initial focusing position data;
moving at least one of the object stage and the objective lens along an optical axis of the objective lens to an initial focusing position according to the initial focusing position data;
controlling the photographing device to photograph the mark in the detecting area of the objective lens during the movement of the object stage or the objective lens;
calculating an optical definition of a mark image photographed by the photographing device, wherein the optical definition is defined as an indicator representing edge sharpness of the mark image photographed by the photographing device having an invariable resolution;
comparing the optical definition of the mark image with a predetermined definition calibration curve to acquire a focal compensation value, wherein the definition calibration curve is a curve which represents optical definitions of the images of the mark which can vary according to the photographed positions; and
calculating an actual focal length to the object to be measured according to the focal compensation value and a predetermined distance between the mark and the object to be measured.

10. The automatic focusing method of claim 9, wherein before calculating the focal compensation value a following step is executed at first:
determining whether the optical definition of the mark image is in a predetermined definition range;
if the optical definition of the mark image is in the predetermined definition range, the actual focal length to the object to be measured is calculated according to the initial focusing position data and the distance between the mark and the object to be measured; and
if the optical definition of the mark is outside the predetermined definition range, the focal compensation value is calculated.

11. The automatic focusing method of claim 9, wherein the step of acquiring the initial focusing position data comprises:
receiving temperature data from a temperature sensor set inside the microscope and outside the microscope; and
acquiring a first position data corresponding to the temperature data on a predetermined temperature-position curve and considering the first position data as the initial focusing position data.

12. The automatic focusing method of claim 11, wherein the first position data is acquiring by:
calculating an equivalent temperature data according to the temperature data from the temperature sensor set inside the microscope and outside the microscope;
finding out the first position data corresponding to the equivalent temperature data on the predetermined temperature-position curve;
wherein the equivalent temperature data is a temperature has an effect equivalent to a synthetic effect of an ambient temperature and an internal temperature of the microscopic image detecting instrument.

13. The automatic focusing method of claim 11, further comprising following steps after acquiring the focal compensation value:
renewing the temperature-position curve according to real-time temperature data and the focal compensation value.

14. The automatic focusing method of claim 9, further comprising following steps after acquiring the actual focusing position data of the object to be measured:
moving at least one of the object stage and the objective lens to an actual focusing position along the optical axis of the objective lens according to the actual focusing position data of the object to be measured.

15. The automatic focusing method of claim 9, the step of comparing the optical definition of the mark image with a predetermined definition calibration curve to acquire a focal compensation value further comprising:
finding out a definition peak on the definition calibration curve;
calculating a first difference between the optical definition of the mark image with the definition peak; and
calculating the focal compensation value as zero if the first difference is less than a predetermined threshold value and calculating a second difference between the initial focusing position data and a second position data corresponding to the definition peak if the first difference is greater than the threshold value.

16. The automatic focusing method of claim 9, the step of comparing the optical definition of the mark image with a predetermined definition calibration curve to acquire a focal compensation value further comprising:
controlling the photographing device to take at least one mark image of the mark every time the object stage or the objective lens moves a predetermined interval during the movement of the object stage and the objective lens to acquire a plurality of mark images corresponding to the positions with the predetermined interval;

calculating optical definition of each mark image;

generating a definition curve segment by arranging the optical definitions of the mark images in accordance with a sequence of the position data corresponding to the mark images and matching the definition curve segment with the definition calibration curve to determine the best matching position of definition on the definition calibration curve; and calculating a third difference between a third position data with the second position data as the focal compensation value, wherein the third position data is a position data on the definition calibration curve corresponding to an optical definition of the last mark image at the best matching position of definition on the definition calibration curve.

17. An automatic focusing system for a microscopic image detecting instrument, the microscopic image detecting instrument comprising a microscope, a photographing device, and a mark, the microscope comprising an object stage configured to hold a object to be measured and an objective lens configured to focus on and magnify the object to be measured, the mark set in a detecting area of the objective lens with a predetermined distance from the object to be measured, the automatic focusing system comprising:

a processor;

a storage device storing a plurality of programs to be executed by the processor to perform certain functions;

an information acquiring module configured to acquire initial focusing position data;

a first control module configured to control at least one of the object stage and the objective lens move to an initial focusing position along an optical axis of the objective lens according to the initial focusing position data;

a second control module configured to control the photographing device to photographs the mark in the detecting area;

a first calculating module configured to calculate the optical definitions of a plurality of images of the mark photographed by the photographing device, wherein the optical definition is defined as an indicator representing edge sharpness of the mark image photographed by the photographing device having an invariable resolution; and a second calculating module configured to determine whether the optical definition of the mark image is in a predetermined definition range, wherein the second calculating module calculates an actual focal length to the object to be measured according to the initial focusing position data and the distance between the mark and the object to be measured if the optical definition of the mark image is in the predetermined definition range, the second calculating module compares the optical definition of the mark image with the definition calibration curve to acquire the focal compensation value and calculates the actual focal length to the object to be measured according to the focal compensation value and the distance between the mark and the object to be measured if the optical definition of the mark image is outside the predetermined definition range, and the definition calibration curve is a curve which represents optical definitions of the images of mark which can vary according to photographed positions.

* * * * *